April 25, 1967  J. KINGSBERY  3,315,819
SADDLE SUPPORT STAND
Filed March 10, 1965
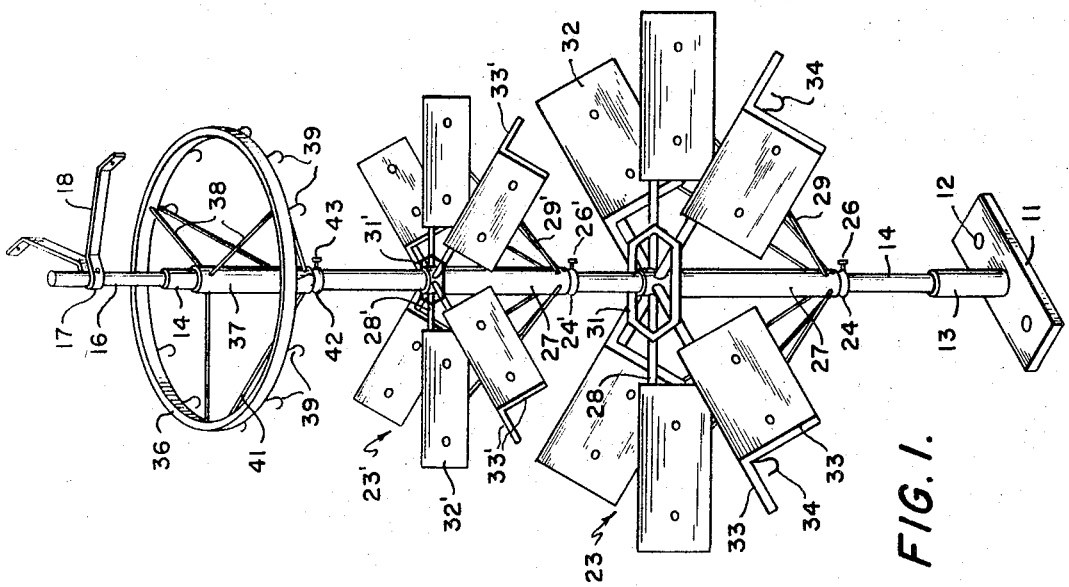
INVENTOR.
JACK KINGSBERY
BY Harold W. Adams
his attorney

United States Patent Office 3,315,819
Patented Apr. 25, 1967

3,315,819
SADDLE SUPPORT STAND
Jack Kingsbery, 1224 E. Maverick,
Crystal City, Tex. 78839
Filed Mar. 10, 1965, Ser. No. 438,555
4 Claims. (Cl. 211—163)

This invention relates to a support stand, and more particularly to a rotary stand for supporting saddles, blankets, harness and tack used in horseback riding.

With the growing popularity of horseback riding there has been a corresponding increase in riding clubs, shows, schools, and saddlery shops dealing in the necessary accoutrements, such as saddles, blankets, harness and tack. Because of the bulk of these items storage is difficult. The large space required for storage and display of saddles, blankets, and tack is of special importance to dealers.

The object of this invention is to provide a stand for supporting saddles, blankets, and saddlery equipment that requires little space and permits ready display and selection of each item.

A further object of this invention is to provide a rotary stand for supporting saddles, blankets, and other equipment such that the respective items may be grouped above each other in determined sets.

Yet another object of this invention is to provide a rotary stand for supporting saddles, blankets, and other equipment that may be installed permanently or may be movable.

Still another object of this invention is to provide a rotary support wherein the respective items, saddles, blankets and tack may be stored at spaced levels on individual racks in groups and wherein each rack is relatively and selectively rotatable to the other, permitting individual selection from each of the rotatable racks.

A further object of this invention is to provide a rotary stand for spacedly supporting saddles, blankets and other saddlery, permitting ease in selection of the respective items and also ventilation for the equipment while stored.

These and many other objects are achieved by the invention which in general may comprise a rotatable vertical shaft fixedly installed at the top and bottom and at least one rack comprising a plurality of radially extending support platforms or seats extending from the vertical shaft. Each seat is angular in cross-section so as to generally conform in configuration to a saddle and sufficiently spaced to receive, support and balance a saddle. A second rack vertically spaced above and similar to the saddle rack is provided for receiving blankets while tack ring secured to the shaft and spaced above the seat racks is provided with spaced hooks around its periphery for supporting tack such as spurs, brushes, and the like.

The respective racks and tack ring may be directly mounted so as to rotate with the shaft, or rotatably secured to the shaft so that each is selectively rotatable relative to the other. A circular base of sufficient diameter to provide a self-supporting stand may be provided for temporary installations.

These and many other objects and advantages will become apparent from the following description when read in view of the appended drawings wherein:

FIGURE 1 is a side view illustrating the invention in a fixed installation;

FIGURE 2 illustrates an alternative embodiment of a circular base for the stand permitting temporary, movable installations; and FIGURE 3 is a sectional view taken along lines 3—3 in FIGURE 1 illustrating a rotary bearing support for the stand.

Referring now to the drawings, FIGURE 1 illustrates a rotary stand in accordance with the invention as generally comprising a flat recangular base 11 of metal or wood having holes 12 for receiving fasteners to secure the base 11 to the floor. A vertically extending pipe or sleeve 13 of metal is attached to base 11 and rotatably receives an axle or shaft 14, such as a metal pipe, that extends substantially the entire height of the stand. A telescoping shaft 16, also a metal pipe, is positioned in the shaft 14 so that the height of the stand may be adjusted as desired. A mounting bracket 17 having angularly disposed legs 18 is affixed to the end of the telescoping shaft 16 for attachment to a wall or other rigid surface.

Referring to FIGURE 3, the end 19 of the shaft 14 is closed and rests on suitable bearings 21 positioned in the bottom of sleeve 13. A port 22 is provided in the sleeve 13 for lubricating the bearing 21 and shaft 14.

A vertically adjustable saddle rack designated generally by the reference numeral 23 is supported on the shaft 14 by means of a slidable outer collar 24 adjustably locked to the shaft 14 by means of a wing nut 26 or other suitable fastener threaded through the collar into engagement with the shaft. The rack 23 comprises an outer sleeve 27 slidably and rotatably received on the shaft 14 and the end of which rests on the collar 24. A plurality of radially extending arms 28 formed of angle iron or the like are welded or otherwise affixed to the sleeve 27 and braced by angularly and upwardly extending members 29, also of angle iron, welded to the sleeve 27 and near the end of the arms 28. The radially extending arms 28 are further braced by interconnecting members 31.

On each arm 28 is mounted a platform or seat 31 for supporting a saddle. The seat 31 comprises a pair of flat members such as wooden boards disposed at substantially 90° to each other along their respective edges to provide an angular cross-sectional configuration substantially conforming to the configuration of a saddle to be supported. The seats are rigidly attached to the spaced arms 28 by suitable fasteners and the members forming the seats are of sufficient length and width as stated as generally to conform in configuration to a saddle and support and balance saddles of varying styles and sizes without tilting of the saddles on the seat. If desired the seats may also have a curved configuration and may be molded from plastic or other suitable material. A hook 34 depending from each arm 28 near the end of each seat 32 is provided for supporting reins, bridle, halter, and other items.

One or more other racks 23' identical with the rack 23 may be similarly adjustably spaced along the shaft 14 and need not be described in detail. The seats 32' of the racks 23' are of the same construction and configuration and may be slightly smaller and shorter than those on the rack 23 for supporting blankets used with the respective saddles supported on the seats 32 in a spread-fashion to insure adequate ventilation of the blankets. The second rack 23' may also be employed for storing smaller size saddles such as children's saddles and blankets.

A feature of the invention is that when the respective racks 23 and 23' are fixedly secured to the shaft and rotate therewith their respective seats on the racks are preferably disposed one above the other so that determined sets of saddles and blankets may be conveniently stored one above the other in a vertically ascending order, thus permitting ease in storage and selection of the respective sets. This is a desirable feature for dealers, permitting them to display and sell selected saddle and blanket combinations.

The sleeves 27 and 27' of the racks 23 and 23' may also be mounted on suitable bearings upon the collars 24 and 24' and adjustably locked to the shaft 14 by wing nuts or other suitable fasteners permitting rotation of the individual racks 23 and 23' relative to each other, or simultaneous rotation when locked to the shaft 14. Thus the individual racks 23 and 23' may be selectively rotatable or rotate with the shaft as desired.

A tack ring 36 spaced above the rack 23' and secured to a sleeve 37 adjustably and rotatably mounted on the shaft 14 by means of radially extending spokes 38 is provided with a plurality of spaced hooks 39 for supporting spurs, brushes, and tack items used by a horseman. Angular braces 41 secured to the sleeve 37 and ring 36 are provided for additional support. This assembly is supported by a collar 42 adjustably secured to the shaft 14 by means of a wing nut 43 or other suitable fastener threaded through the collar 42 into engagement with the shaft 14. If desired the sleeve 37 may be mounted on bearings on the collar 42 to provide free and independent rotation of the tack ring 36. A lock member such as a wing nut may also be provided to lock the sleeve 37 to the shaft 14. Thus it can be seen that by providing a combination of saddle, blanket and tack ring individual sets of equipment may be easily stored and selected in a vertically ascending order, one above the other.

Referring to FIGURE 2, an alternative embodiment of the stand base is shown as comprising a circular ring 44 affixed to a sleeve 13' by means of radially extending spokes 46. The ring 44 is further supported by means of angular rods welded to the spokes 46 and the sleeve 13'. The sleeve 13' rotatably receives a shaft 14' as described in FIGURE 1 and the diameter of the ring 44 is of sufficient size to provide a movable, upright, self-supporting stand without any additional support so that the stand may be moved as required.

Although preferred embodiments of the invention have been described in detail numerous changes and modifications may be made within the scope of the principles of the invention, which is to be limited only by the appended claims.

I claim:
1. A combination saddle and blanket stand comprising: a base; a vertically adjustable shaft rotatably supported on said base; a first rack fixedly secured to said shaft, said first rack including a plurality of spaced seats for receiving saddles extending radially from said shaft, the cross-sectional configuration of said seats being angular and substantially conforming in configuration to that of a saddle; a second rack vertically spaced above said first rack and fixedly secured to said rotatable shaft similar to the first rack and including a plurality of radially extending seats smaller in length and angular cross-sectional configuration for receiving blankets for the respective saddles, said seats on said second rack positioned directly above the seats on said first rack, thereby maintaining selected sets of saddles and blankets in determined order, one above the other, for ease in storage and selection.

2. The combination stand as defined in claim 1 including a tack ring spaced above said second rack and fixedly secured to said rotatable shaft and a plurality of spaced hooks depending from the periphery of said tack ring for supporting tack items for the respective and selected sets of saddles and blankets whereby the saddle, blanket and tack of individual sets are supported in a direct vertically ascending order.

3. The stand as defined in claim 2 including a circular base of sufficient diameter to provide a self-supporting and movable stand.

4. The stand as defined in claim 2 including means for securing the base to a floor; a telescoping rod positioned within and extending from said shaft; and bracket means affixed to said telescoping rod for securing said stand to a supporting surface.

References Cited by the Examiner
UNITED STATES PATENTS

| | | | |
|---|---|---|---|
| 492,304 | 2/1893 | Markle | 312—135 |
| 1,751,505 | 3/1930 | Borland | 211—163 |
| 2,071,290 | 2/1937 | Scriba | 211—58 |
| 2,639,820 | 5/1953 | Lee | 211—163 |
| 2,760,746 | 8/1956 | Botolfsen | 248—224 |
| 2,941,669 | 6/1960 | Palay et al. | 211—1.6 |
| 2,953,252 | 9/1960 | Koontz | 211—13 |
| 2,972,420 | 2/1961 | Tucci | 211—95 |
| 3,194,403 | 7/1965 | Van Horn | 211—78 |

CLAUDE A. LE ROY, *Primary Examiner.*

K. J. WINGERT, *Assistant Examiner.*